(12) United States Patent
Yang et al.

(10) Patent No.: US 9,391,462 B2
(45) Date of Patent: Jul. 12, 2016

(54) ENERGY STORAGE SYSTEM WITH WIRED AND WIRELESS ENERGY TRANSFER FUNCTION

(75) Inventors: Yil Suk Yang, Daejeon (KR); Jong Dae Kim, Daejeon (KR); Se Wan Heo, Daejeon (KR); Ji Min Oh, Daejeon (KR); Min Ki Kim, Gyeongsangbuk-do (KR); Jong Kee Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 916 days.

(21) Appl. No.: 13/596,618

(22) Filed: Aug. 28, 2012

(65) Prior Publication Data

US 2013/0193774 A1    Aug. 1, 2013

(30) Foreign Application Priority Data

Jan. 30, 2012    (KR) .................. 10-2012-0008906

(51) Int. Cl.
*H01F 27/42* (2006.01)
*H02J 5/00* (2016.01)
*H02J 7/00* (2006.01)

(52) U.S. Cl.
CPC ............... *H02J 5/005* (2013.01); *H02J 7/0063* (2013.01)

(58) Field of Classification Search
CPC ................................. H02J 5/005; H02J 7/0063
USPC ...................................................... 307/104
See application file for complete search history.

(56) References Cited

U.S. PATENT DOCUMENTS

| 7,471,062 | B2 | 12/2008 | Bruning | |
|---|---|---|---|---|
| 2005/0245291 | A1 | 11/2005 | Brown et al. | |
| 2009/0033154 | A1* | 2/2009 | Linkhart | H02J 9/06 307/65 |
| 2009/0315393 | A1* | 12/2009 | Yeh | 307/10.1 |

(Continued)

FOREIGN PATENT DOCUMENTS

| KR | 10-2011-0037523 A | 4/2011 |
|---|---|---|
| KR | 10-2011-0099499 A | 9/2011 |

OTHER PUBLICATIONS

Haihua Zhou et al., "Composite Energy Storage System Involving Battery and Ultracapacitor With Dynamic Energy Management in Microgrid Applications", IEEE Transactions on Power Electronics, Mar. 2011, pp. 923-930, vol. 26, No. 3.

*Primary Examiner* — Jared Fureman
*Assistant Examiner* — Duc M Pham
(74) *Attorney, Agent, or Firm* — Rabin & Berdo, P.C.

(57) ABSTRACT

Disclosed is an energy storage system provided with a wired and wireless energy transfer function. The energy storage system includes: an energy input unit to which energy generated from a plurality of energy sources is input; an energy input control unit for selecting one energy source from among the plurality of energy sources, and transferring energy of the selected energy source through operation in a wired operation mode or a wireless operation mode; a wireless energy transmitting/receiving unit for wirelessly transmitting/receiving the energy of the selected energy source during the operation in the wireless operation mode of the energy input control unit; an energy storage/control unit for storing the energy of the selected energy source; an energy output unit for consuming the energy stored in the energy storage/control unit; and an energy output control unit for distributing the energy stored in the energy storage/control unit to the energy output unit.

11 Claims, 3 Drawing Sheets

(56) References Cited

U.S. PATENT DOCUMENTS

| | | | |
|---|---|---|---|
| 2011/0199032 A1* | 8/2011 | Ueda | H02M 5/297 318/430 |
| 2011/0221276 A1* | 9/2011 | Geinzer | H02J 3/32 307/66 |
| 2011/0254377 A1* | 10/2011 | Wildmer et al. | 307/104 |
| 2012/0169064 A1* | 7/2012 | Hoffman et al. | 290/1 R |

* cited by examiner

ENERGY STORAGE SYSTEM WITH WIRED AND WIRELESS ENERGY TRANSFER FUNCTION

CROSS-REFERENCE TO RELATED APPLICATIONS

This application is based on and claims priority from Korean Patent Application No. 10-2012-0008906, filed on Jan. 30, 2012, with the Korean Intellectual Property Office, the disclosure of which is incorporated herein in its entirety by reference.

TECHNICAL FIELD

The present disclosure relates to an energy storage system. More particularly, the present disclosure relates to an energy storage system provided with a wired and wireless energy transfer function, in which energy of various energy sources can be utilized in various application fields through the wired and wireless energy transfer function.

BACKGROUND

A smart grid is a next generation smart electrical grid by which a conventional energy provider and consumers can communicate with each other in bidirection instead of unidirection. It can utilize energy generated from environment-friendly new renewable energy sources, such as sunlight, wind power and tidal power, as well as base energy sources, such as atomic power and thermal power. Also, the smart grid requires an energy storage device for storing energy input from various energy sources in order to perform two-way communication. In general, the energy storage device includes a secondary battery pack having multiple secondary battery cells and module.

Meanwhile, in a smart grid environment, an energy storage system for a micro smart grid is required, which can maximize energy efficiency by efficiently storing energy input from various energy sources in an energy storage device, managing and maintaining the stored energy, and controlling and managing the energy so as to effectively distribute power of a power source according to load condition of an output load at the proper moment. Further, a wireless energy transfer technology of wirelessly storing energy in an energy storage device, which has no wires and thus is simple and can be utilized in various application fields, has been recently gradually considered more importantly than a wired energy transfer technology of wiredly storing energy in an energy storage device.

SUMMARY

The present disclosure has been made in an effort to solve the above described problems, and provides an energy storage system provided with a wired and wireless energy transfer function, in which energy input from various energy sources can be utilized in various application fields through the wired and wireless energy transfer function.

An exemplary embodiment of the present disclosure provides an energy storage system provided with a wired and wireless energy transfer function, the energy storage system including: an energy input unit to which energy generated from a plurality of energy sources is input; an energy input control unit for selecting one energy source from among the plurality of energy sources, and transferring energy of the selected energy source through operation in a wired operation mode or a wireless operation mode; a wireless energy transmitting/receiving unit for wirelessly transmitting/receiving the energy of the selected energy source during the operation in the wireless operation mode of the energy input control unit; an energy storage/control unit for storing the energy of the selected energy source; an energy output unit for consuming the energy stored in the energy storage/control unit; and an energy output control unit for distributing the energy stored in the energy storage/control unit to the energy output unit.

As described above, in the energy storage system provided with the wired and wireless energy transfer function for a smart grid, according to the present disclosure, it is possible to efficiently store energy of various energy sources through a wired or wireless energy transfer method, to efficiently distribute the stored energy, and thus, to apply the energy in various application fields.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. In a description of the present disclosure, a detailed description of related known configurations and functions will be omitted when it may make the essence of the present disclosure obscure.

Figure 1:
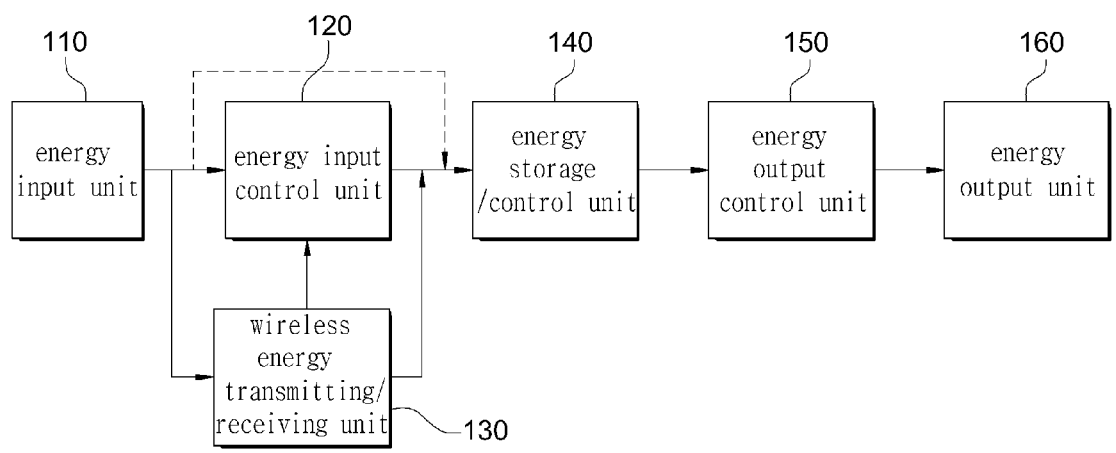
FIG. 1 shows a configuration of an energy storage system provided with a wired and wireless energy transfer function, according to one embodiment of the present disclosure.

FIG. 1 shows a configuration of an energy storage system provided with a wired and wireless energy transfer function, according to one embodiment of the present disclosure.

Referring to FIG. 1, the inventive energy storage system includes: an energy input unit 110 to which energy generated from a plurality of energy sources is input; an energy input control unit 120 for selecting one energy source from among the plurality of energy sources, and transferring energy of the selected energy source to an energy storage/control unit 140 through operation in a wired operation mode or a wireless operation mode; a wireless energy transmitting/receiving unit 130 for wirelessly transmitting/receiving the energy of the energy source selected by the energy input control unit 120 during the operation in the wireless operation mode of the energy input control unit 120; the energy storage/control unit 140 for storing and controlling the energy of the energy source selected by the energy input control unit 120; an energy output control unit 150 for efficiently distributing and managing the energy stored in the energy storage/control unit 140 to output loads of an energy output unit 160; and the energy output unit 160 for directly consuming the energy stored in the energy storage/control unit 140.

The energy input unit 110 performs a function of receiving, as inputs, irregular and random electric energy harvested from natural peripheral multi self-charging energy converting devices (multi energy harvesting devices), instable electric energy generated from a new renewable energy source, and stable electric energy generated from a base electric energy source.

The energy input control unit 120 performs a function of selecting one energy source from among the plurality of energy sources, selecting the wired operation mode or the wireless operation mode, and transferring the energy of the selected energy source to the energy storage/control unit 140 through the operation in the wired operation mode or the wireless operation mode.

The wireless energy transmitting/receiving unit 130 performs a function of wirelessly transmitting/receiving the energy of the energy source selected by the energy input control unit 120 during the operation in the wireless operation mode of the energy input control unit 120.

The energy storage/control unit 140 performs a function of storing the energy of the energy source selected by the energy input control unit 120, and managing and controlling the stored energy.

The energy output control unit 150 performs a function of distributing and managing the energy stored in the energy storage/control unit 140 according to the condition of output loads of the energy output unit 160.

The energy output unit 160 performs a function of directly consuming the energy stored in the energy storage/control unit 140.

Meanwhile, the energy storage system according to one embodiment of the present disclosure has four routes for storing and distributing an energy, as described below, which may be properly selected and used according to application fields.

First, the energy of the energy source selected by the energy input control unit 120 is stored in the energy storage/control unit 140 by a control signal of the energy input control unit 120 by sequentially passing through the energy input unit 110 and the energy input control unit 120, and the energy stored in the energy storage/control unit 140 is distributed to the energy output unit 160 by a control signal of the energy output control unit 150.

Second, the energy of the energy source selected by the energy input control unit 120 is stored in the energy storage/control unit 140 by a control signal of the energy input control unit 120 by sequentially passing through the energy input unit 110, the wireless energy transmitting/receiving unit 130 and the energy input control unit 120, and the energy stored in the energy storage/control unit 140 is distributed to the energy output unit 160 by a control signal of the energy output control unit 150.

Third, the energy of the energy source selected by the energy input control unit 120 is stored in the energy storage/control unit 140 by sequentially passing through the energy input unit 110 and the wireless energy transmitting/receiving unit 130, and the energy stored in the energy storage/control unit 140 is distributed to the energy output unit 160 by a control signal of the energy output control unit 150.

Fourth, the energy of the energy source selected by the energy input control unit 120 is directly stored in the energy storage/control unit 140 via the energy input unit 110, and the energy stored in the energy storage/control unit 140 is distributed to the energy output unit 160 by a control signal of the energy output control unit 150.

Figure 2:
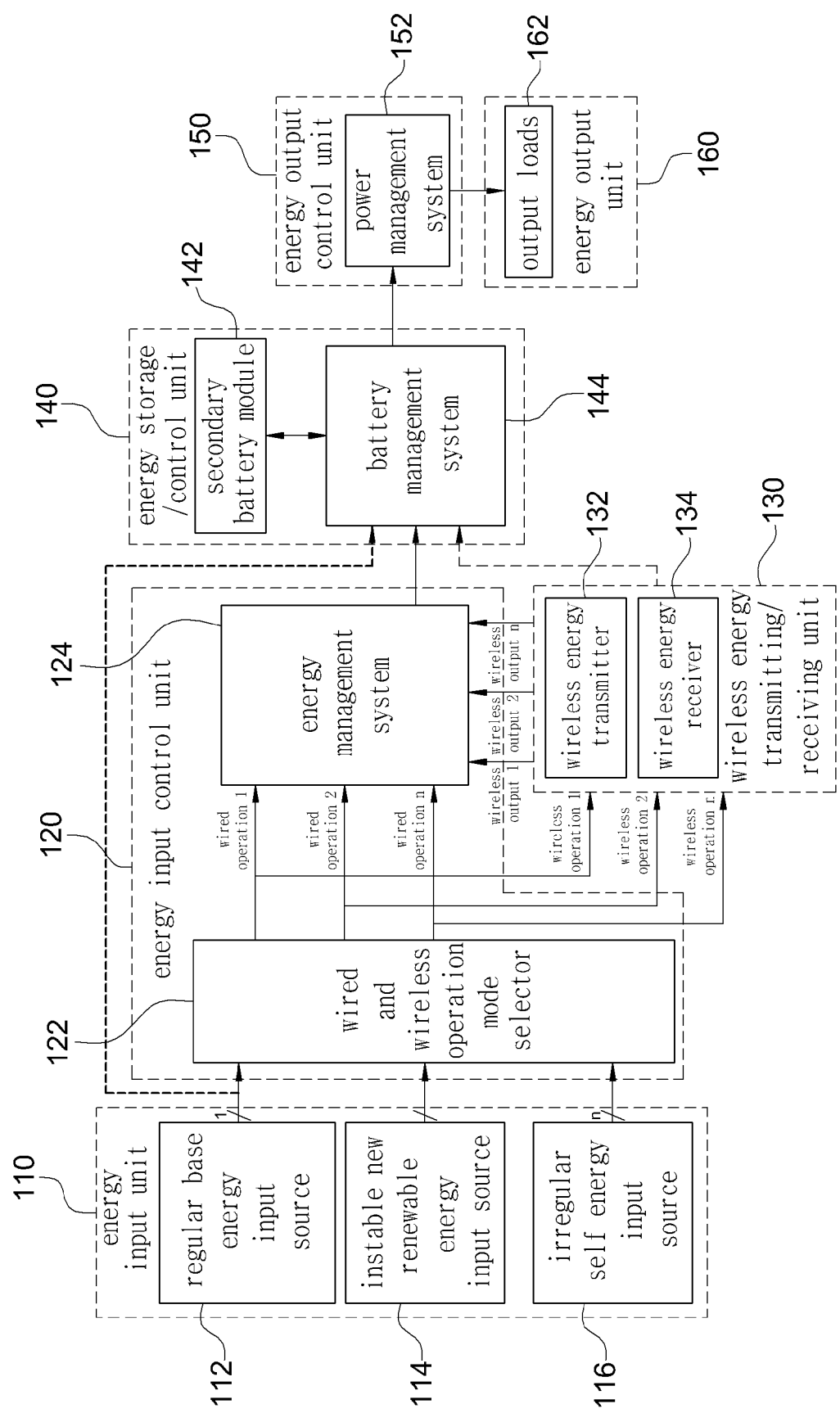
FIG. 2 shows a detailed configuration of the energy storage system provided with the wired and wireless energy transfer function, according to one embodiment of the present disclosure.

FIG. 2 shows a detailed configuration of the energy storage system provided with the wired and wireless energy transfer function, according to one embodiment of the present disclosure.

Referring to FIG. 2, the inventive energy storage system includes the energy input unit 110 including n energy input sources 112, 114, and 116; the energy input control unit 120 including a wired and wireless operation mode selector 122 and an energy management system 124; the wireless energy transmitting/receiving unit 130 including a wireless energy transmitter 132 and a wireless energy receiver 134; the energy storage/control unit 140 including a secondary battery module 142 and a battery management system 144; the energy output control unit 150 including a power management system 152; and the energy output unit 160 including output loads 162.

The energy input unit 110 includes: an irregular self energy input source 116 to which irregular and random electric energy harvested from multi self-charging energy converting devices is input; an instable new renewable energy input source 114 to which instable electric energy generated from a new renewable energy source is input; and a regular base energy input source 112 to which stable electric energy generated from a base electric energy source is input.

The energy output from the irregular self energy input source 116 receiving, as an input, the energy harvested from the multi self-charging energy converting devices including natural peripheral thermoelectric-, piezoelectric-, motion-, or vibration-energy converting devices is very randomly generated with lapse of time in a very small amount. Thus, a circuit for efficiently storing it in the energy storage/control unit 140 is required. The energy output from the instable new renewable energy input source 114 receiving, as an input, the energy generated from the natural peripheral new renewable energy source such as sunlight, wind power and tidal power instably is generated according to the condition of natural environment. Thus, a circuit for efficiently storing it in the energy storage/control unit 140 is required.

On the other hand, the energy output from the regular base energy input source 112 receiving, as an input, the energy generated from the base electric energy source such as atomic power, thermal power and hydraulic power plants is very stably and continuously generated. Thus, a circuit for storing it in the energy storage/control unit 140 is not required.

Accordingly, the inventive energy storage system uses the regular base energy input source 112 as a main energy source.

The energy input control unit 120 includes the wired and wireless operation mode selector 122 for selecting the wired operation mode or the wireless operation mode; and the energy management system 124 for selecting one energy source from among n energy sources by controlling n energy input sources 112, 114, and 116, and transferring energy of the selected energy source to the energy storage/control unit 140.

The wired and wireless operation mode selector 122 may select 2n operation modes (n wired operation modes+n wireless operation modes) in order to wiredly or wirelessly combine with n energy input sources 112, 114, and 116.

The energy management system 124, to which n wired operation mode outputs from the wired and wireless operation selector 122 and n wireless operation mode outputs from the wireless energy transmitting/receiving unit 130 are input, performs a function of operating in one operation mode from among 2n operation modes while selecting one energy source from among n energy sources, and transferring the energy of the selected energy source to the energy storage/control unit 140.

The wireless energy transmitting/receiving unit 130 operates only in the wireless operation mode of the wired and wireless operation mode selector 122 of the energy input control unit 120, and for this, includes the wireless energy transmitter 132 and the wireless energy receiver 134.

The energy storage/control unit 140 includes: the secondary battery module 142 for storing the energy of the energy source selected by the energy management system 124; and the battery management system 144 for performing functions of cell balancing, management and control of the secondary battery module 142.

The energy output control unit 150 includes the power management system 152 and performs a function of distributing and managing the energy stored in the energy storage/control unit 140 according to the condition of the output loads 162 of the energy output unit 160.

The energy output unit 160 includes the output loads 162 such as RF, processors, peripheral devices, sensors, various kinds of home appliances, and electric vehicles, and performs a function of directly consuming the energy stored in the energy storage/control unit 140.

Meanwhile, the energy storage system as configured above has four routes for storing and distributing energy, as described below, which may be properly selected and used according to application fields.

First, by n energy input sources 112, 114, and 116 and the wired and wireless operation mode selector 122, n wired operation mode outputs are generated, and then, by a control signal of the energy management system 124, one energy source from among n energy sources is selected. The energy of the selected energy source is transferred to the battery management system 144 and stored in the secondary battery module 142. By a control signal of the power management system 152, the energy stored in the secondary battery module 142 is distributed to the output loads 162 of the energy output unit 160.

Second, by n energy input sources 112, 114, and 116 and the wired and wireless operation mode selector 122, n wireless operation mode outputs are generated, and then, by a control signal of the energy management system 124, one energy source from among n energy sources is selected. The energy of the selected energy source is transferred to the battery management system 144 and stored in the secondary battery module 142. By a control signal of the power management system 152, the energy stored in the secondary battery module 142 is distributed to the output loads 162 of the energy output unit 160.

Third, by n energy input sources 112, 114, and 116 and the wired and wireless operation mode selector 122, n wireless operation mode outputs are generated, and then, by a control signal of the energy management system 124, one energy source from among n energy sources is selected. The energy of the selected energy source is stored in the secondary battery module 142, and then by a control signal of the power management system 152, the energy stored in the secondary battery module 142 is distributed to the output loads 162 of the energy output unit 160.

Fourth, from the regular base energy input source 112 from among n energy input sources 112, 114, and 116, one energy source 112 is directly selected by a control signal of the battery management system 144, and then the energy of the selected energy source 112 is stored in the secondary battery module 142. By a control signal of the power management system 152, the energy stored in the secondary battery module 142 is distributed to the output loads 162 of the energy output unit 160.

Figure 3:
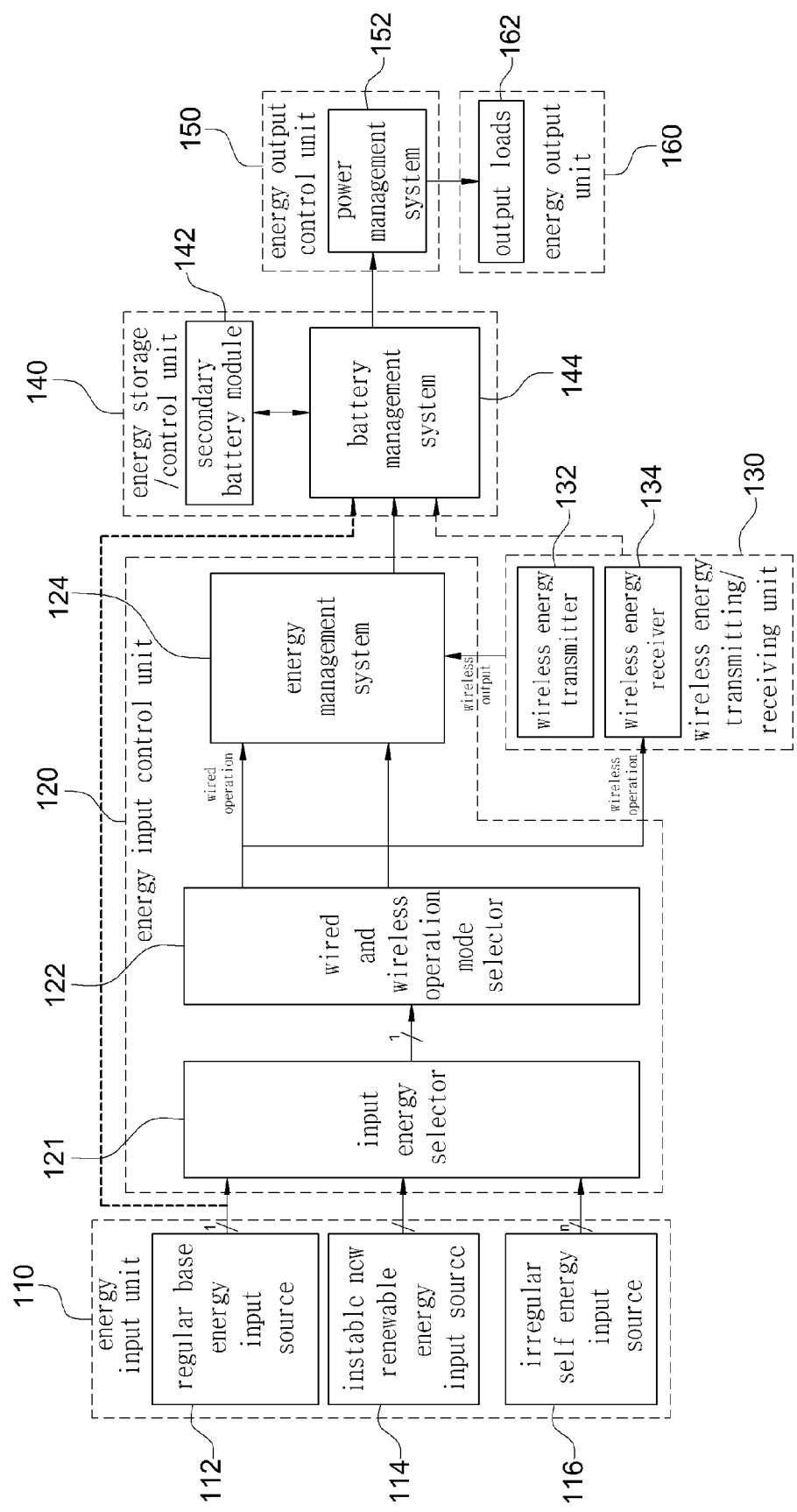
FIG. 3 shows a more detailed configuration of the energy storage system provided with the wired and wireless energy transfer function, according to one embodiment of the present disclosure.

FIG. 3 shows a more detailed configuration of the energy storage system provided with the wired and wireless energy transfer function, according to one embodiment of the present disclosure.

Referring to FIG. 3, the inventive energy storage system includes the energy input unit 110 including n energy input sources 112, 114, and 116; the energy input control unit 120 including an input energy selector 121, the wired and wireless operation mode selector 122 and the energy management system 124; the wireless energy transmitting/receiving unit 130 including the wireless energy transmitter 132 and the wireless energy receiver 134; the energy storage/control unit 140 including the secondary battery module 142 and the battery management system 144; the energy output control unit 150 including the power management system 152; and the energy output unit 160 including the output loads 162.

In other words, the energy storage system shown in FIG. 3 has the same components as those in that shown in FIG. 2, except for the configuration of the energy input control unit 120.

Specifically, the energy input control unit 120 includes: the input energy selector 121 for selecting one energy source from among n energy sources by controlling n energy input sources 112, 114, and 116; the wired and wireless operation mode selector 122 for selecting the wired operation mode or the wireless operation mode; and the energy management system 124 for transferring the energy of the energy source selected by the input energy selector 121 to the energy storage/control unit 140.

The wired and wireless operation mode selector 122 may determine 2 operation modes (1 wired operation mode+1 wireless operation mode).

The energy management system 124, to which 1 wired operation mode output from the wired and wireless operation selector 122 and 1 wireless operation mode output from the wireless energy transmitting/receiving unit 130 are input, performs a function of operating in one operation mode from among the 2 operation modes while transferring the energy of the energy source selected by the input energy selector 121 to the energy storage/control unit 140.

Meanwhile, the energy storage system as configured above has four routes for storing and distributing energy, as described below, which may be properly selected and used according to application fields.

First, by n energy input sources 112, 114, and 116, the input energy selector 121, and the wired and wireless operation mode selector 122, 1 wired operation mode output is generated, and the energy of the energy source selected by the control signal of the energy management system 124 is transferred to the battery management system 144 and stored in the secondary battery module 142. Then, by the control signal of the power management system 152, the energy stored in the secondary battery module 142 is distributed to the output loads 162.

Second, by n energy input sources 112, 114, and 116, the input energy selector 121, and the wired and wireless operation mode selector 122, 1 wireless operation mode output is generated, and the energy of the energy source selected by the control signal of the energy management system 124 is transferred to the battery management system 144 and stored in the secondary battery module 142. Then, by the control signal of the power management system 152, the energy stored in the secondary battery module 142 is distributed to the output loads 162.

Third, by n energy input sources 112, 114, and 116, the input energy selector 121, and the wired and wireless operation mode selector 122, 1 wireless operation mode output is generated, and the energy of the energy source selected by the control signal of the battery management system 144 is stored in the secondary battery module 142. Then, by the control signal of the power management system 152, the energy stored in the secondary battery module 142 is distributed to the output loads 162.

Fourth, from the regular base energy input source 112 from among n energy input sources 112, 114, and 116, one energy source 112 is directly selected by the control signal of the battery management system 144, and the energy of the energy source 112 is stored in the secondary battery module 142. By the control signal of the power management system 152, the energy stored in the secondary battery module 142 is distributed to the output loads 162.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An energy storage system provided with a wired and wireless energy transfer function, the energy storage system comprising:
    an energy input unit to which energy generated from a plurality of energy sources is input;
    an energy input control unit for selecting one energy source from among the plurality of energy sources, and transferring energy of the selected energy source through operation in a wired operation mode or a wireless operation mode;
    a wireless energy transmitting/receiving unit for wirelessly transmitting/receiving the energy of the selected energy source during the operation in the wireless operation mode of the energy input control unit;
    an energy storage/control unit for storing the energy of the selected energy source;
    an energy output unit for consuming the energy stored in the energy storage/control unit; and
    an energy output control unit for distributing the energy stored in the energy storage/control unit to the energy output unit,
    wherein the energy input unit comprises an irregular self energy input source, an instable new renewable energy input source and a regular base energy input source,
    wherein the regular base energy input source is stable electric energy generated from a base electric energy source,
    wherein energy from a selected one of the plurality of energy sources passes through the energy input control unit and/or the wireless energy transmitting/receiving unit and is stored in the energy storage/control unit via the energy input control unit in an indirect operation mode, and
    wherein energy from a selected one of the plurality of energy sources is directly stored in the energy storage/control unit by a control signal of the energy storage/control unit in a direct operation mode.

2. The energy storage system of claim 1, wherein in a first indirect operation mode, the energy of the selected energy source is stored in the energy storage/control unit by a control signal of the energy input control unit by sequentially passing through the energy input unit and the energy input control unit, and the energy stored in the energy storage/control unit is distributed to the energy output unit by a control signal of the energy output control unit.

3. The energy storage system of claim 1, wherein in a second indirect operation mode, the energy of the selected energy source is stored in the energy storage/control unit by a control signal of the energy input control unit by sequentially passing through the energy input unit, the wireless energy transmitting/receiving unit and the energy input control unit, and the energy stored in the energy storage/control unit is distributed to the energy output unit by a control signal of the energy output control unit.

4. The energy storage system of claim 1, wherein in a third indirect operation mode, the energy of the selected energy source is stored in the energy storage/control unit by sequentially passing through the energy input unit and the wireless energy transmitting/receiving unit, and the energy stored in the energy storage/control unit is distributed to the energy output unit by a control signal of the energy output control unit.

5. The energy storage system of claim 1, wherein the energy stored in the energy storage/control unit is distributed to the energy output unit by a control signal of the energy output control unit.

6. The energy storage system of claim 1, wherein
    the irregular self energy input source is irregular and random electric energy harvested from multi self-charging energy converting devices, and
    instable new renewable energy input source is instable electric energy generated from a new renewable energy source.

7. The energy storage system of claim 1, wherein the energy input control unit comprises:
    a wired and wireless operation mode selector for selecting the wired operation mode or the wireless operation mode; and
    an energy management system for selecting one energy source from among the plurality of energy sources, and transferring the energy of the selected energy source to the energy storage/control unit through operation in an operation mode selected by the wired and wireless operation mode selector.

8. The energy storage system of claim 1, wherein the energy input control unit comprises:
    an input energy selector for selecting one energy source from among the plurality of energy sources;
    a wired and wireless operation mode selector for selecting the wired operation mode or the wireless operation mode; and
    an energy management system for transferring the energy of the energy source selected by the input energy selector to the energy storage/control unit through operation in an operation mode selected by the wired and wireless operation mode selector.

9. The energy storage system of claim 1, wherein the secondary battery module is used to store the energy from an energy source that is at least one of the irregular self energy input source and the instable new renewable energy input source.

10. The energy storage system of claim 4, wherein the one energy source from the plurality of energy sources is selected as the selected energy source by a control signal of the energy input control unit.

11. The energy storage system of claim 5, wherein the one energy source from the plurality of energy sources is selected as the selected energy source by a control signal of the energy storage/control unit.

* * * * *